Figures 1, 2:
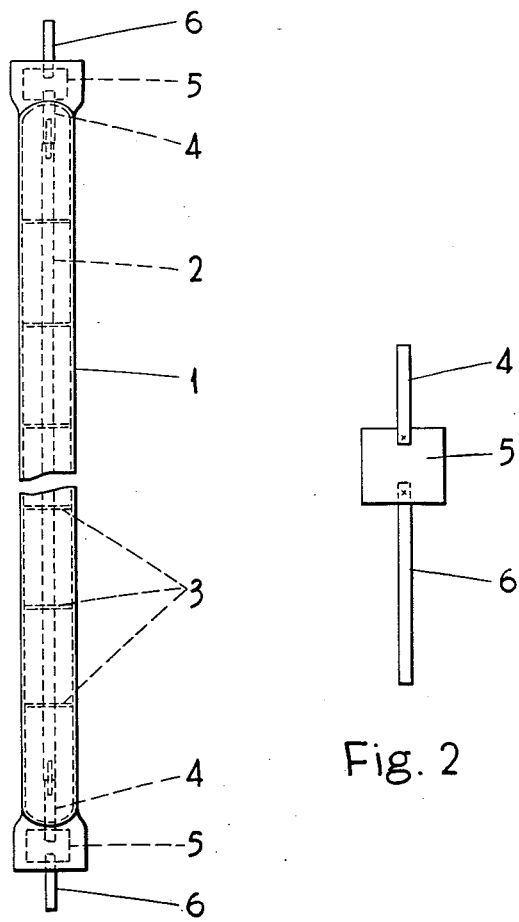

Dec. 5, 1961    F. E. POOLE    3,012,167
ENVELOPES FOR ELECTRICAL DEVICES
Filed July 6, 1960

INVENTOR
FREDERICK EDWARD POOLE
BY
Kirschstein, Kirschstein & Ottinger
ATTORNEYS United States Patent Office 3,012,167
Patented Dec. 5, 1961

3,012,167
ENVELOPES FOR ELECTRICAL DEVICES
Frederick Edward Poole, Pinner, England, assignor to The General Electric Company Limited, London, England
Filed July 6, 1960, Ser. No. 41,072
Claims priority, application Great Britain July 14, 1959
6 Claims. (Cl. 313—216)

The present invention relates to envelopes for electrical devices which envelopes are of the kind consisting wholly or mainly of vitreous silica and having at least one vitreous silica part through which is sealed an electrical conductor designed to convey electric current into the envelope. The invention relates also to electrical devices having such envelopes and containing electrical energy converting means connected to the inner parts of two or more said electrical conductors.

One method of sealing a conductor into a vitreous silica envelope is by means of a molybdenum foil seal. Such a seal is formed by placing within a tubular part of the envelope a conductor at least part of which consists of a thin molybdenum foil, heating the surrounding silica until soft, and collapsing or pinching it on to the molybdenum foil to embed the latter hermetically.

The thermal coefficient of expansion of molybdenum is higher than that of vitreous silica, but by using suitably thin foil and, if necessary, reducing the thickness of the foil at the edges so that it is of approximately aerofoil shape in section, a mechanically strong seal may be formed. The foil may extend throughout the vitreous silica seal, but usually the conductor is a composite one consisting of a short length of molybdenum foil to the ends of which are attached, usually by spot welding, metal wire conductors, usually of tungsten or molybdenum, and the composite conductor is so positioned that the whole of the molybdenum foil with a short length of the attached conductor on either side of it is embedded in the silica.

Molybdenum foil seals have hitherto generally proved satisfactory for use with most electrical devices having a silica envelope, but in cases where the seal is required to run at an unusually high temperature in air or an oxygen-containing atmosphere, the device of which it forms part is liable to fail after an undesirably short period of use, owing to failure at the seal. This failure has been due to oxidation starting at the outer conductor of the seal and creeping along the surface of the conductor to the molybdenum foil. Failures of this kind are liable to occur, for example, with infra-red heating lamps having a refractory metal filament with a tubular vitreous silica envelope, and high pressure mercury vapour electric discharge lamps having a vitreous silica discharge envelope containing electrodes for the passage of the discharge and mounted within an oxygen-containing outer jacket.

An object of the present invention is to reduce the above-mentioned difficulty.

The invention depends on the use of platinum-sheathed molybdenum or platinum-sheathed tungsten, by which, for the purpose of this specification, is meant metal formed by inserting a rod of molybdenum or tungsten into a platinum tube and drawing the composite rod so formed through dies to form a strip or wire of very much smaller diameter. The wire may be either used as such or may be further rolled to form a strip.

We have found that platinum-sheathed molybdenum or platinum-sheathed tungsten of this kind used in molybdenum foil seals is unexpectedly better than molybdenum or tungsten protected with platinum or other noble metals in other ways, for example by electro-plating. The reason for this is not at present fully understood but may be due to the avoidance of pin-holes which occur in other methods, and to improved bonding as a result of the extensive working of the metals which takes place during the drawing.

According, therefore, to the present invention, an envelope of the kind referred to for an electrical device, includes at least one molybdenum foil seal in a vitreous silica part of which seal at least the part of the seal conductor extending through the silica to the exterior of the envelope consists of platinum-sheathed molybdenum or platinum-sheathed tungsten.

Preferably the conductor of the seal is composite, having a foil of molybdenum totally embedded in the silica and the outer part of the conductor is welded to the foil and consists of a strip or wire of platinum-sheathed molybdenum or platinum-sheathed tungsten.

In some cases the molybdenum foil member of the seal may itself be of platinum-sheathed molybdenum rolled at the edges to reduce it to a suitably thin section, and such a foil might in some cases be formed integrally with the outer part of the conductor of the seal and possibly also with the inner part of the conductor) by rolling down a part only of a single length of platinum-sheathed molybdenum wire.

One embodiment of the invention will now be described with reference to the accompanying drawing in which FIGURE 1 shows diagrammatically a tungsten filament lamp having a vitreous silica envelope and intended for use for infra-red heating, and FIGURE 2 shows a composite conductor forming the conducting element of a pinch seal at each end of the envelope.

Referring first to FIGURE 1, the envelope of the lamp consists of a tube of vitreous silica 1 down the centre of which passes a tungsten filament 2 in the form of a helix and which is maintained in the center of the tubular envelope 1 by a series of spaced tantalum washers 3. The ends of the filament are connected to the inner members of composite conductors which are sealed into the tube 1 at each end by a molybdenum foil pinch seal.

One of these composite conductors is shown in FIGURE 2 and consists of an inner member 4 of molybdenum strip 0.1 mm. thick, 1.2 mm. wide, and 10 mm. long. This strip is spot-welded to a strip of molybdenum foil 5 prepared as described below, and to which there is also welded a strip 6 of platinum-sheathed molybdenum manufactured by cold-rolling to 0.2 mm. thick strip form, a wire of 0.7 mm. diameter formed by drawing through dies a platinum-sheathed molybdenum rod, the thickness of the platinum amounting to 25% by weight of the sheathed molybdenum. The strip 6 of FIGURE 2 consists of a length of this latter strip 18 mm. long, and is spot welded to the molybdenum foil 5. The molybdenum foil 5 is originally 7 mm. wide, 7.5 mm. long, and 0.07 mm. thick, and is etched before welding to reduce its overall thickness to 0.05 mm., the etching treatment producing feather edges at the sides of the strip.

The tungsten filament 2 with its spacers 3 in position is connected at one end to a conductor 4 of the composite seal conductor shown in FIGURE 2, and at the other end to the corresponding member of an exactly similar composite conductor, and is inserted into a length of silica tube. A pinch seal is formed at one end by heating the silica tube to its softening point and pressing it into contact with the composite conductor so that the whole of the foil 5 and a short length of the conductors 4 and 6 on each side are embedded within the silica of the pinch, a stream of inert gas being passed down the tube in known manner during this operation to protect the molybdenum from oxidation. A similar pinch seal is then similarly formed at the other end of the tube 1.

The envelope may be provided with the desired gas filling and sealed off in any desired manner, for example by means of a pumping stem (not shown) extending from the side of the envelope, and terminal caps connected to the strip 5 can be attached to the pinched ends of the envelope, for example as described in patent specification No. 817,908.

It will be understood that in this specification the terms "tungsten" and "molybdenum" include alloys consisting primarily of these metals that are suitable for use in seals of the kind concerned in this invention.

I claim:

1. An envelope for an electrical device, said envelope including a vitreous silica part having at least one conductor extending therethrough and sealed thereto, said conductor comprising molybdenum foil sealed within said silica part, and at least the part of the conductor which extends from the silica to the exterior of the envelope constituting a material selected from the class consisting of platinum-sheathed molybdenum and platinum-sheathed tungsten.

2. An envelope according to claim 1 in which the conductor is composite, including a foil of molybdenum totally embedded in the silica part and an outer part welded to the foil and consisting of an elongated narrow member of a material selected from the class consisting of platinum-sheathed molybdenum and platinum-sheathed tungsten.

3. An envelope according to claim 1 in which the molybdenum foil of the conductor is constituted of molybdenum sheathed in platinum and rolled at the edges so as to provide reduced thin sections thereat.

4. An envelope according to claim 3 in which the molybdenum foil is formed integrally with at least the outer part of the conductor by rolling down a part only of a single length of a platinum-sheathed molybdenum wire.

5. An electric device having an envelope according to claim 1 containing energy converting means connected to the inner parts of at least two molybdenum foil conductors, each of which has platinum-sheathed outer parts.

6. An electrical device according to claim 5 having a tubular vitreous silica envelope containing electrical energy converting means connected at each end of the envelope to the inner part of the molybdenum foil conductor closing that end of the envelope, and in which at least the outer part of each said conductor constitutes a member made from material selected from the class consisting of platinum-sheathed molybdenum and platinum-sheathed tungsten.

References Cited in the file of this patent

UNITED STATES PATENTS 2,622,222     Hageman et al. _____ Dec. 16, 1952

FOREIGN PATENTS 476,488     Great Britain _____ Dec. 6, 1937